US011165516B2

United States Patent
Tseng et al.

(10) Patent No.: US 11,165,516 B2
(45) Date of Patent: Nov. 2, 2021

(54) CALIBRATION SYSTEM, RADIO FREQUENCY SYSTEM, AND OUTPUT POWER LINEARIZATION METHOD THEREOF

(71) Applicant: Realtek Semiconductor Corporation, Hsinchu (TW)

(72) Inventors: Kuan-Hao Tseng, Hsinchu (TW); Ka-Un Chan, Hsinchu (TW); Po-Chih Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/015,206

(22) Filed: Sep. 9, 2020

(65) Prior Publication Data
US 2021/0281332 A1   Sep. 9, 2021

(30) Foreign Application Priority Data
Mar. 6, 2020   (TW) .................................. 109107529

(51) Int. Cl.
*H04L 25/49*      (2006.01)
*H04B 17/13*      (2015.01)
*H04B 17/10*      (2015.01)
*H04B 17/24*      (2015.01)

(52) U.S. Cl.
CPC ........... *H04B 17/13* (2015.01); *H04B 17/102* (2015.01); *H04B 17/24* (2015.01)

(58) Field of Classification Search
CPC ....... H04B 17/13; H04B 17/24; H04B 17/102

USPC ......................................... 375/262, 296, 297
See application file for complete search history.

(56) References Cited

U.S. PATENT DOCUMENTS

| 8,472,897 B1* | 6/2013 | Yang ......................... H03F 3/24 455/114.3 |
| 9,294,045 B2* | 3/2016 | Scott ........................ H03F 3/211 |
| 2010/0127774 A1* | 5/2010 | Wang .................... H03F 1/3247 330/149 |
| 2013/0162349 A1* | 6/2013 | Gao ...................... H03F 1/3241 330/75 |

(Continued)

FOREIGN PATENT DOCUMENTS

CN         101627550 B       8/2013

*Primary Examiner* — Don N Vo
(74) *Attorney, Agent, or Firm* — Locke Lord LLP; Tim Tingkang Xia, Esq.

(57) ABSTRACT

An output power linearization method, suitable for a calibration system, includes the following operations: providing an instruction signal, which corresponding to a currently ideal output power among multiple ideal output powers, to an emission module of the calibration system so that the emission module outputs a radio frequency (RF) signal with a practical output power according to the instruction signal; obtaining a feedback signal, by a feedback circuit of the calibration system, from an output terminal of the emission module, and calculating a feedback output power from the feedback signal; calculating an output difference between the currently ideal output power and the feedback output power; if an absolute value of the output difference is larger than an absolute value of a feedback error of the feedback circuit, adjusting a present gain of the emission module so that the practical output power approaches the currently ideal output power.

18 Claims, 10 Drawing Sheets

(56) References Cited

U.S. PATENT DOCUMENTS

2016/0157173 A1\* 6/2016 Shen ................... H04W 52/281
370/311

\* cited by examiner

CALIBRATION SYSTEM, RADIO FREQUENCY SYSTEM, AND OUTPUT POWER LINEARIZATION METHOD THEREOF

RELATED APPLICATION

The present application claims priority to Taiwan Application Serial Number 109107529, filed Mar. 6, 2020, which is incorporated herein by reference in its entirety.

BACKGROUND

Technical Field

The present disclosure relates to a calibration system, radio frequency chip, and output power linearization method thereof. More particularly, the present disclosure relates to a calibration system capable of automatically establishing output power control table.

Description of Related Art

In different usage scenarios, radio frequency transmitters usually switch the output power of their power amplifiers adaptively according to a built-in output power control tables to extend the battery life of mobile devices. In order to make the multi-level output power of the power amplifier increase linearly, in tradition, the equivalent size of the transistor in the power amplifier for each input code of the digital control signal is manually adjusted, and the adjustment result is recorded in the output power control table.

SUMMARY

One aspect of the present disclosure is to provide an output power linearization method which includes: providing an instruction signal to an emission module of the calibration system, wherein the instruction signal corresponding to a currently ideal output power among a plurality of ideal output powers, and the emission module outputs a radio frequency signal with a practical output power according to the instruction signal; obtaining a feedback signal, by a feedback circuit of the calibration system, from an output terminal of the emission module, and calculating a feedback output power from the feedback signal; calculating an output difference between the currently ideal output power and the feedback output power; and if an absolute value of the output difference is larger than an absolute value of a feedback error of the feedback circuit, adjusting a present gain of the emission module so that the practical output power approaches the currently ideal output power.

Some aspects of the present disclosure provide a calibration system comprising a baseband control circuit, an emission module, a feedback circuit, and a compensation value calculating circuit. The baseband control circuit is configured to provide an instruction signal to the emission module, in which the instruction signal corresponds to a currently ideal output power among a plurality of ideal output powers. The emission module is configured to output a radio frequency signal with a practical output power according to the instruction signal. The feedback circuit is configured to obtaining a feedback signal from an output terminal of the emission module, in which the baseband control circuit is configured to calculate a feedback output power from the feedback signal, and is configured to calculate an output difference between the currently ideal output power and the feedback output power. The compensation value calculating circuit is coupled to the baseband control circuit, in which if the compensation value calculating circuit determines an absolute value of the output difference is larger than an absolute value of a feedback error of the feedback circuit, the baseband control circuit adjusts a present gain of the emission module so that the practical output power approaches the currently ideal output power.

Some aspects of the present disclosure provide a radio frequency chip comprising a baseband control circuit, an emission module, a feedback circuit, and a compensation value calculating circuit. The baseband control circuit is configured to provide an instruction signal to the emission module, in which the instruction signal corresponds to a currently ideal output power among a number of ideal output powers. The emission module is configured to output a radio frequency signal with a practical output power according to the instruction signal. The feedback circuit is configured to obtain a feedback signal from an output terminal of the emission module, in which the baseband control circuit is configured to calculate a feedback output power from the feedback signal, and is configured to calculate an output difference between the currently ideal output power and the feedback output power, in which the baseband control circuit is further configured to be coupled to a compensation value calculating circuit, and when the compensation value calculating circuit determines an absolute value of the output difference is larger than an absolute value of a feedback error of the feedback circuit, the baseband control circuit adjusts a present gain of the emission module so that the practical output power approaches the currently ideal output power.

It is to be understood that both the foregoing general description and the following detailed description are by examples, and are intended to provide further explanation of the disclosure as claimed.

DETAILED DESCRIPTION

The embodiments of the present disclosure will be described below in conjunction with related drawings. In the drawings, the same reference numerals indicate the same or similar elements or method process.

Figure 1:
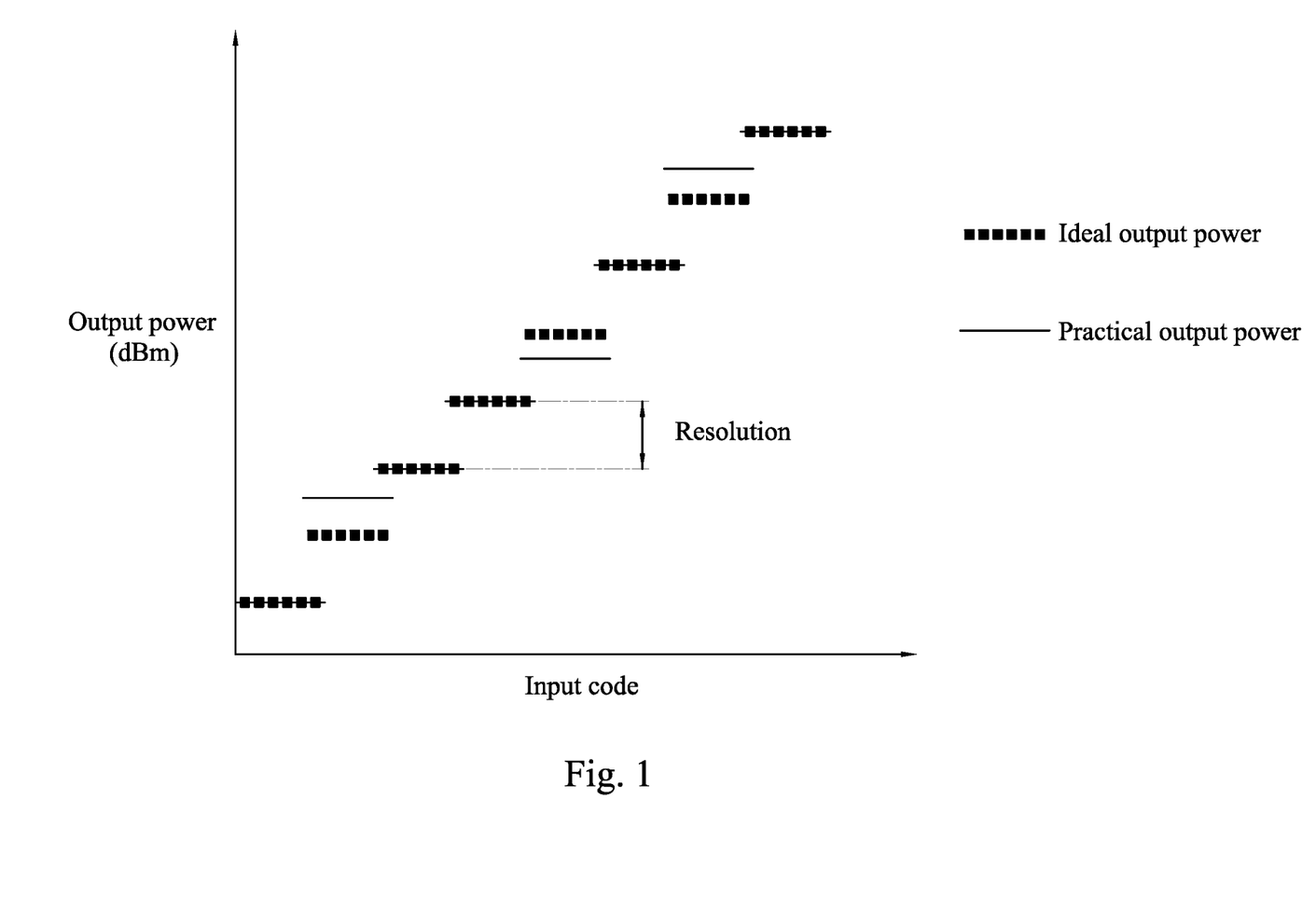
FIG. 1 is a schematic diagram of output characteristics of a power amplifier.

FIG. 1 is a schematic diagram of output characteristics of a power amplifier. Ideally, a multi-level output power provided by the power amplifier for different digital input codes increases linearly. However, due to various factors such as process error and ambient temperature, there is a difference between a practical output power and an ideal output power of the power amplifier.

Figure 2:
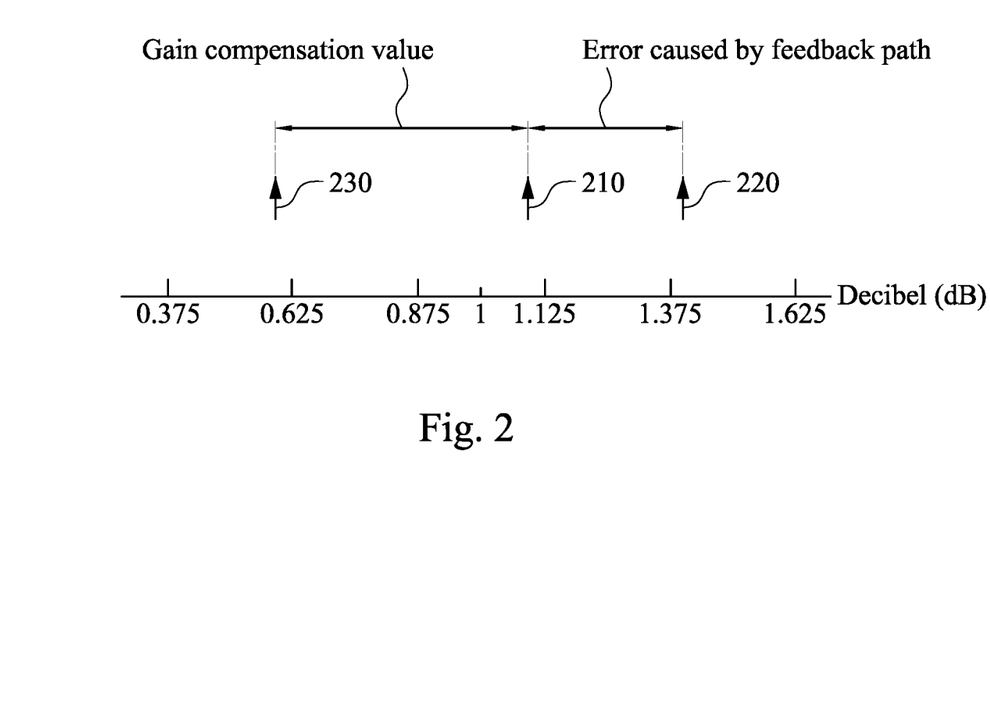
FIG. 2 is a schematic diagram of linearization process for the output power of the power amplifier.

FIG. 2 is a schematic diagram of linearization process for the output power of the power amplifier. Arrows 210, 220 and 230 in FIG. 2 respectively represent the practical output power of the power amplifier, a feedback output power detected by an output terminal of the power amplifier, and the compensated practical output power of the power amplifier, in which the term "compensated" means that a gain of the power amplifier is manually adjusted or adjusted by circuit such that the multi-level output power increases linearly. The scale 1 in the center of FIG. 2 represents the ideal output power of the power amplifier, and the remaining scales represent threshold values used to determine power compensation values. A decibel range between each two threshold values is generally set to an output resolution (e.g., 0.5 decibel) or half of the output resolution of the power amplifier. As shown in FIG. 1, the output resolution represents a difference between two ideal output powers provided by the power amplifier for adjacent digital input codes.

Reference is now made to FIG. 2 again, in general, each time when the feedback output power (arrow 220) exceeds one of the threshold values, the gain of the power amplifier will be increased or decreased by one unit of the power compensation value, in which each unit of the power compensation value is usually set to the output resolution (e.g., 0.5 decibel) of the power amplifier. However, the feedback output power (arrow 220) may differ from the practical output power (arrow 210) due to an error caused by a feedback path. In this situation, the power amplifier will obtain an incorrect gain compensation value, causing the compensated practical output power (arrow 230) has an incorrect value.

For instance, in a situation that the output resolution is slightly smaller than the error of the feedback path, as shown in FIG. 2, even if the practical output power (arrow 230) has not exceeded the threshold values closest to the ideal output power so that it does not need to be compensated, the power amplifier still obtains the gain compensation value corresponding to twice the output resolution, such that a difference between the compensated practical output power (arrow 230) and the ideal output power exceeds twice the output resolution.

Figure 3:
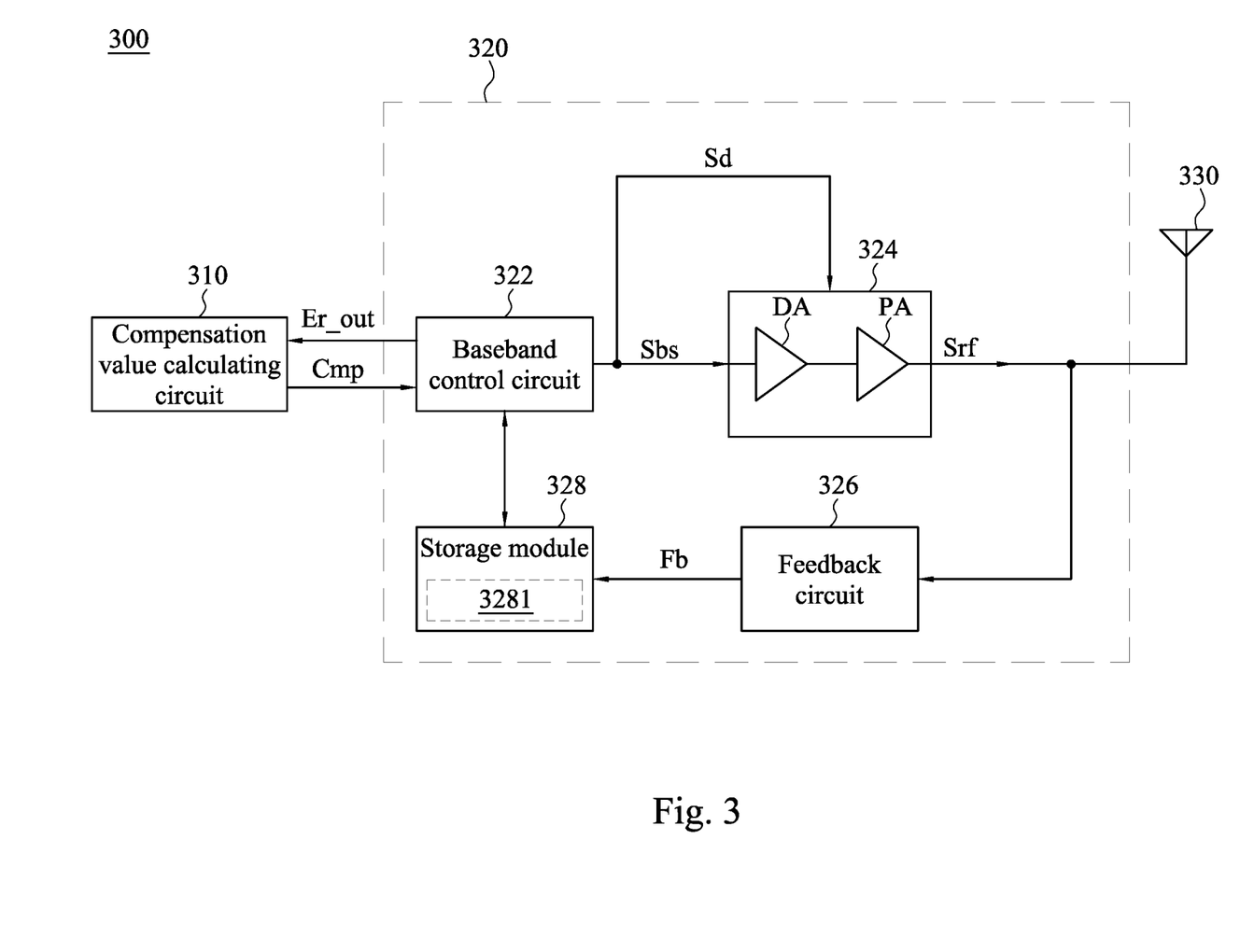
FIG. 3 is a simplified function block diagram of calibration system, in accordance with an embodiment of the present disclosure.

FIG. 3 is a simplified function block diagram of a calibration system 300, in accordance with an embodiment of the present disclosure. The calibration system 300 comprises a compensation value calculating circuit 310 and a radio frequency system 320, in which the radio frequency system 320 comprises a baseband control circuit 322, an emission module 324, the feedback circuit 326 and a storage module 328. The baseband control circuit 322 is configured to provide a baseband signal Sbs and an instruction signal Sd to the emission module 324. The baseband signal Sbs may carry various information to be transmitted by an antenna 330, and the instruction signal Sd is configured to control the emission module 324 to switch its gain (or transmitted power). The emission module 324 is coupled to the baseband control circuit 322, and comprises a driver amplifier DA and power amplifier PA. The emission module 324 is configured to modulate the baseband signal Sbs to a radio frequency signal Srf.

The feedback circuit 326 is coupled between an output terminal of the emission module 324 (or the output terminal of the power amplifier PA) and the storage module 328. The feedback circuit 326 is configured to transform the radio frequency signal Srf to a feedback signal Fb, and the storage module 328 will store the feedback output power by which the feedback signal Fb represents. In practice, the feedback circuit 326 may be implemented by a metal wire which is parallel to a transmission line across the output terminal of the emission module 324 to the antenna 330, in other words, the feedback circuit 326 may be indirectly coupled to the output terminal of the emission module 324. An attenuator, an analog-to-digital converter and a wave filter, etc., may be connected in series between the feedback circuit 326 and the storage module 328, for the sake of brevity, these circuits are not shown in FIG. 3.

The baseband control circuit 322 will read the feedback output power and a corresponding ideal output power from the storage module 328, and provide an output difference Er_out between the feedback output power and the ideal output power to the compensation value calculating circuit 310. The compensation value calculating circuit 310 transmits a corresponding gain compensation value Cmp to the baseband control circuit 322 according to the output difference Er_out, and the baseband control circuit 322 adjusts the instruction signal Sd according to the gain compensation value Cmp received to increase or decrease the gain of the emission module 324. In this way, the practical output power of the emission module 324 will approach the ideal output power.

In practice, the compensation value calculating circuit 310 may be implemented by a personal computer, a field programmable gate arrays (FPGA), an application specific integrated circuits (ASIC) or other programmable logic devices.

Figure 4A:
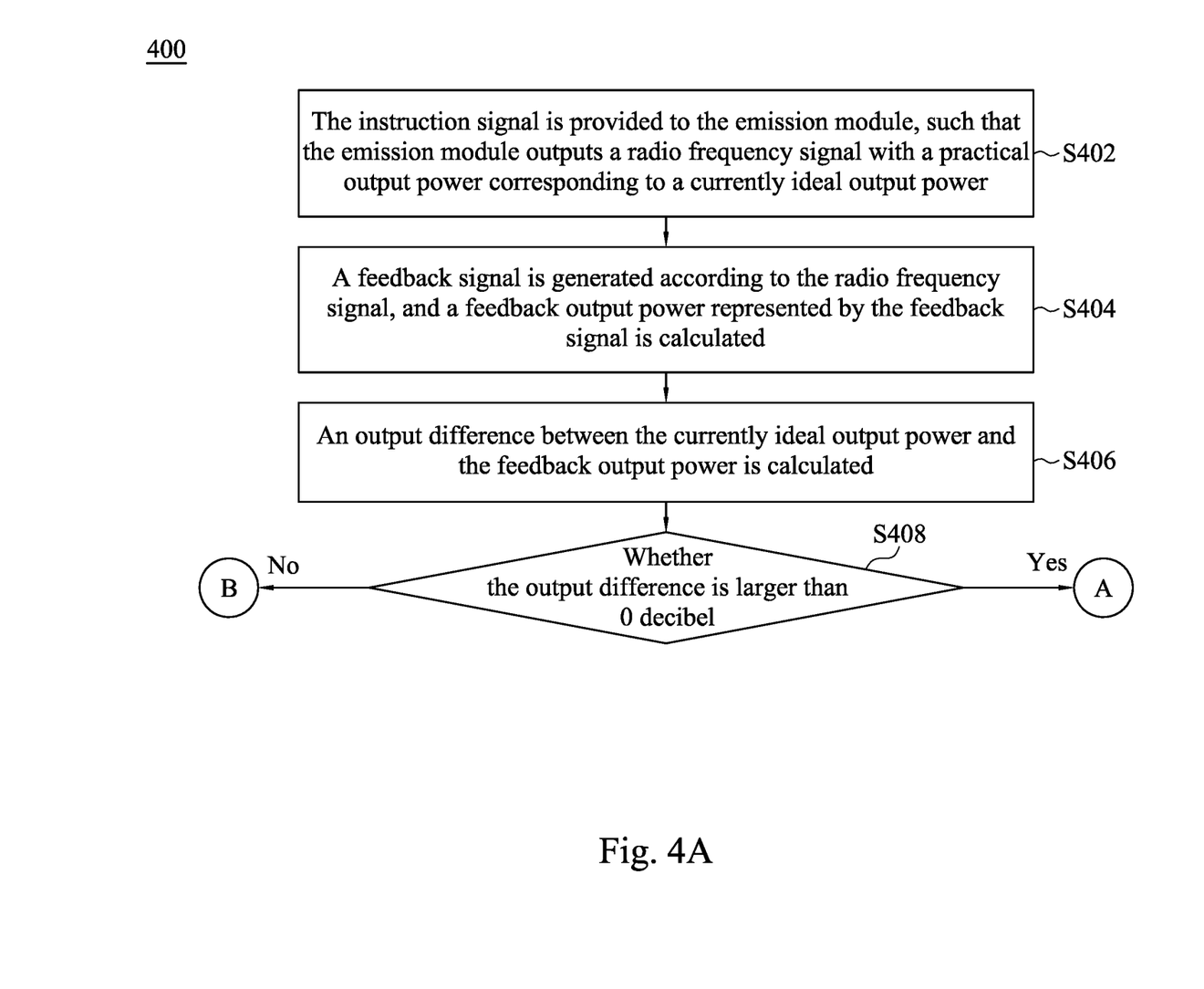
FIGS. 4A-4C is a flowchart of an output power linearization method, in accordance with an embodiment of the present disclosure.
Figure 4B:
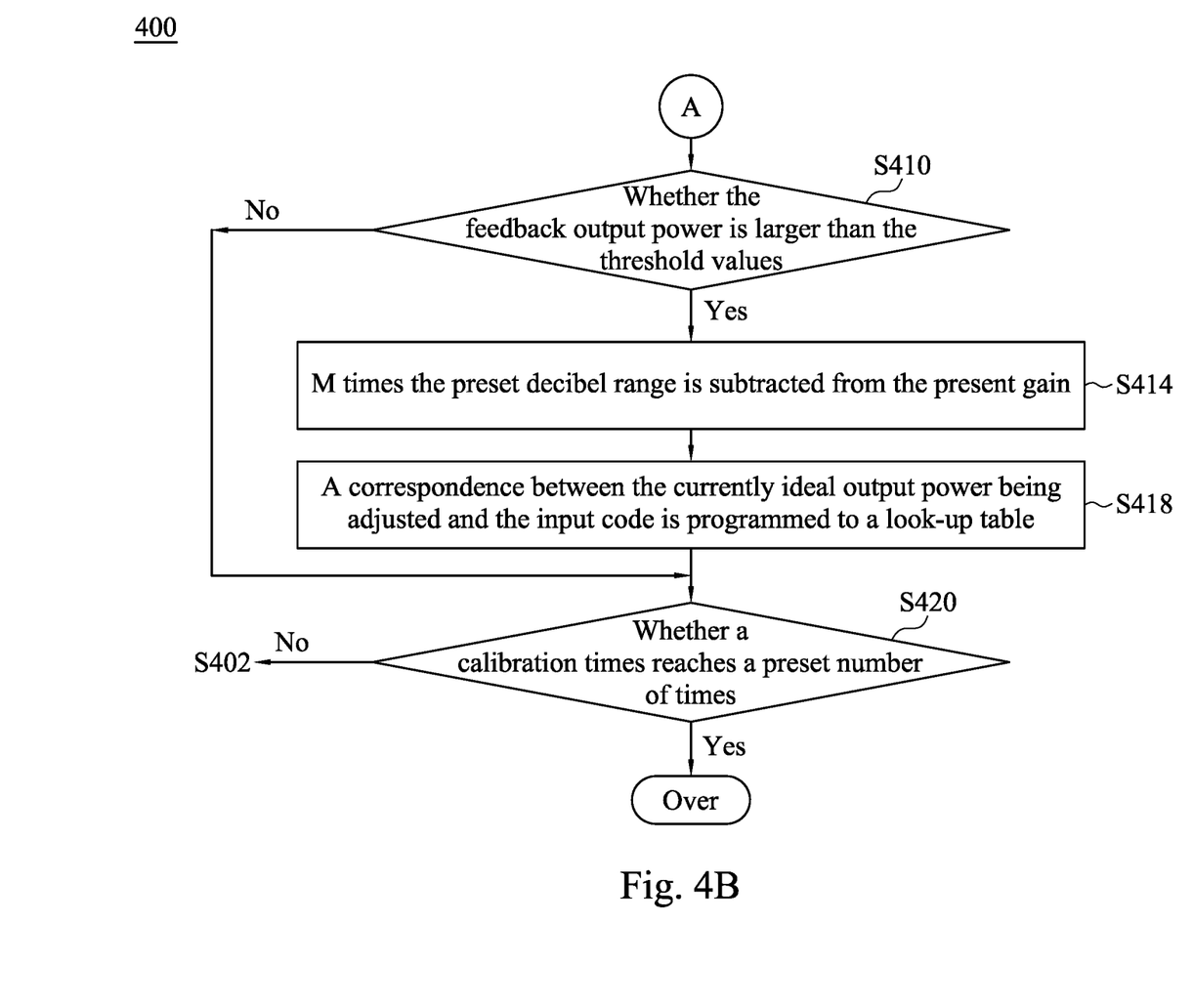
Figure 4C:
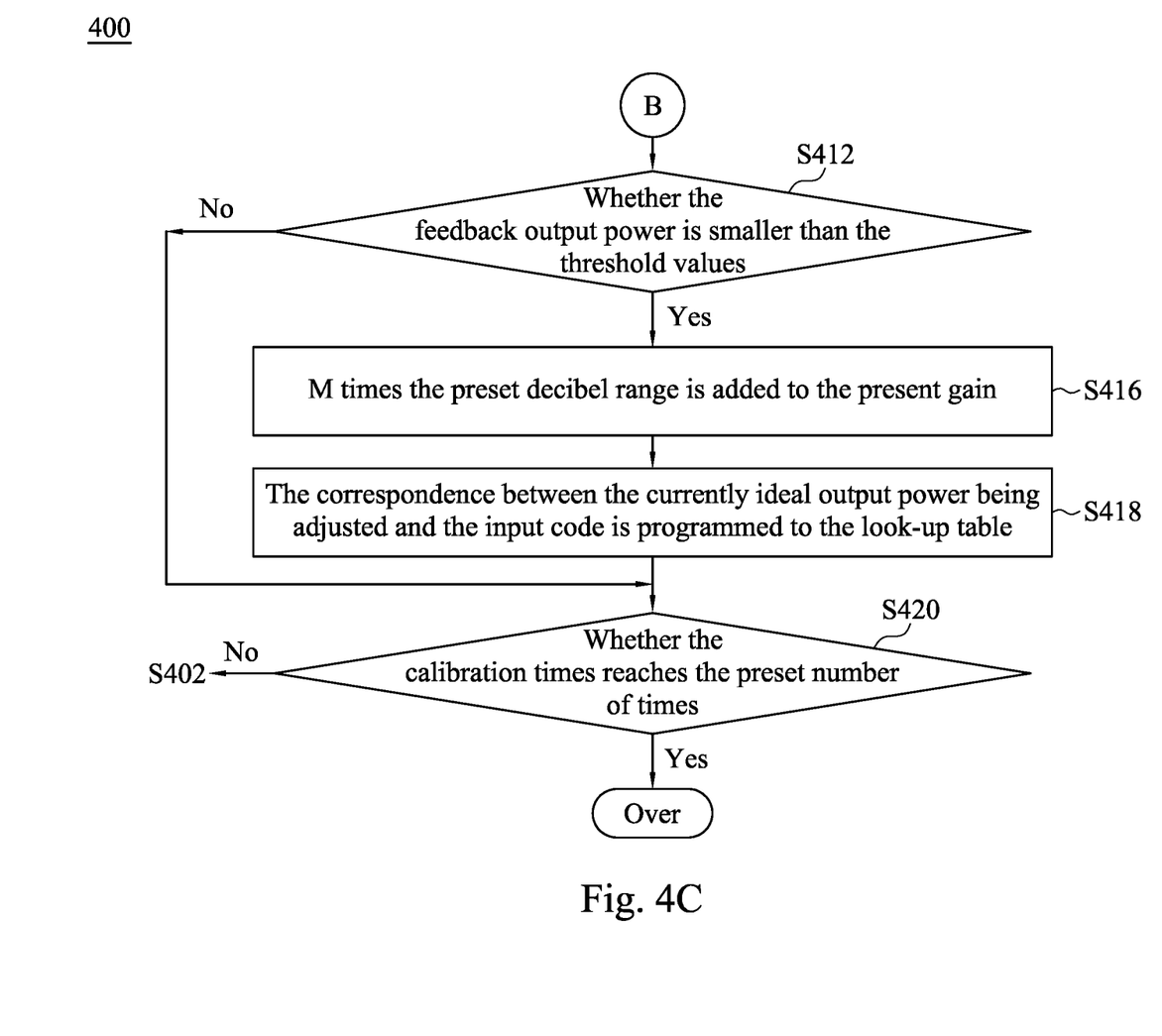
Figure 5A:
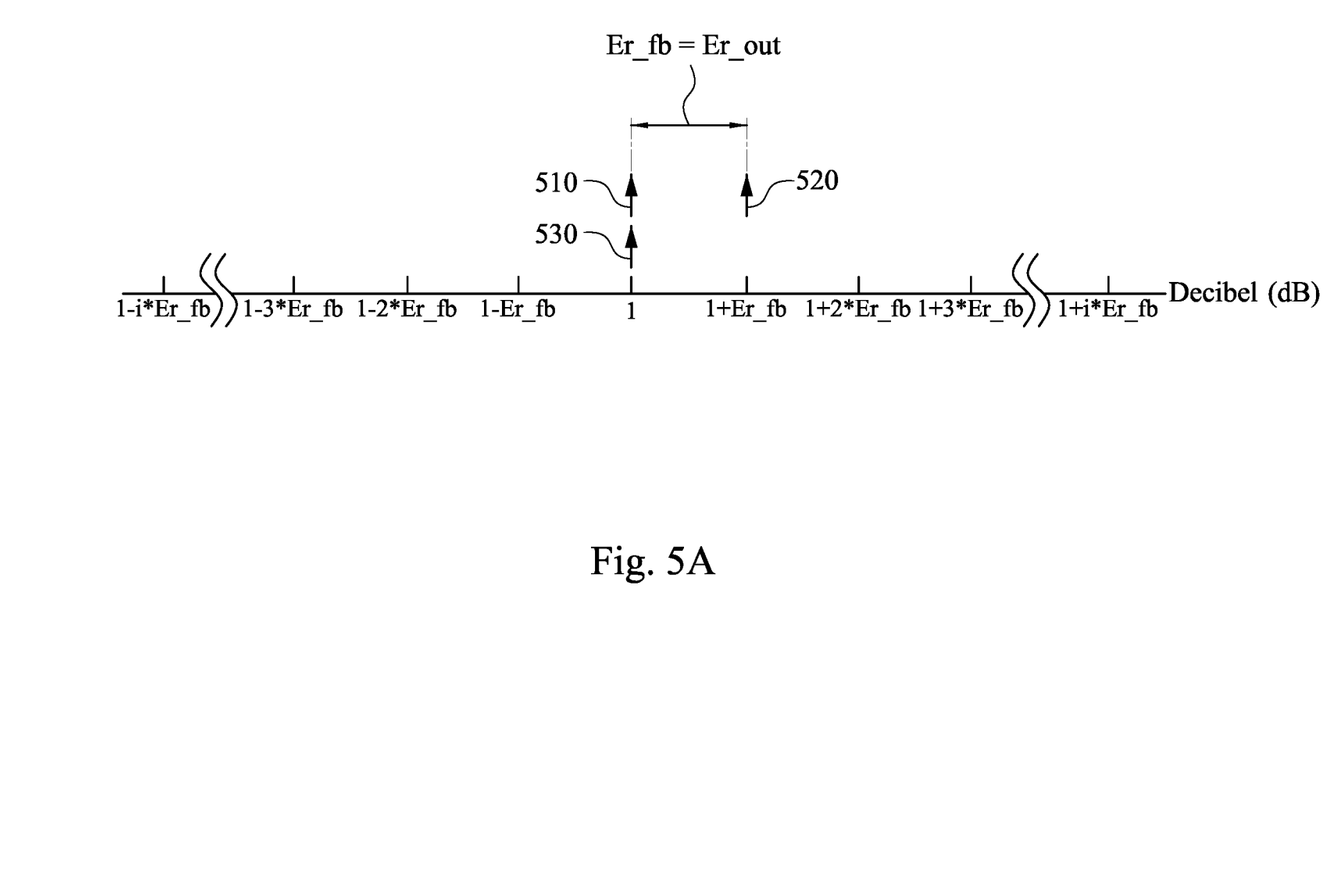
FIG. 5A is a schematic diagram of linearization process for output power of emission module, in accordance with an embodiment of the present disclosure.
Figure 5B:
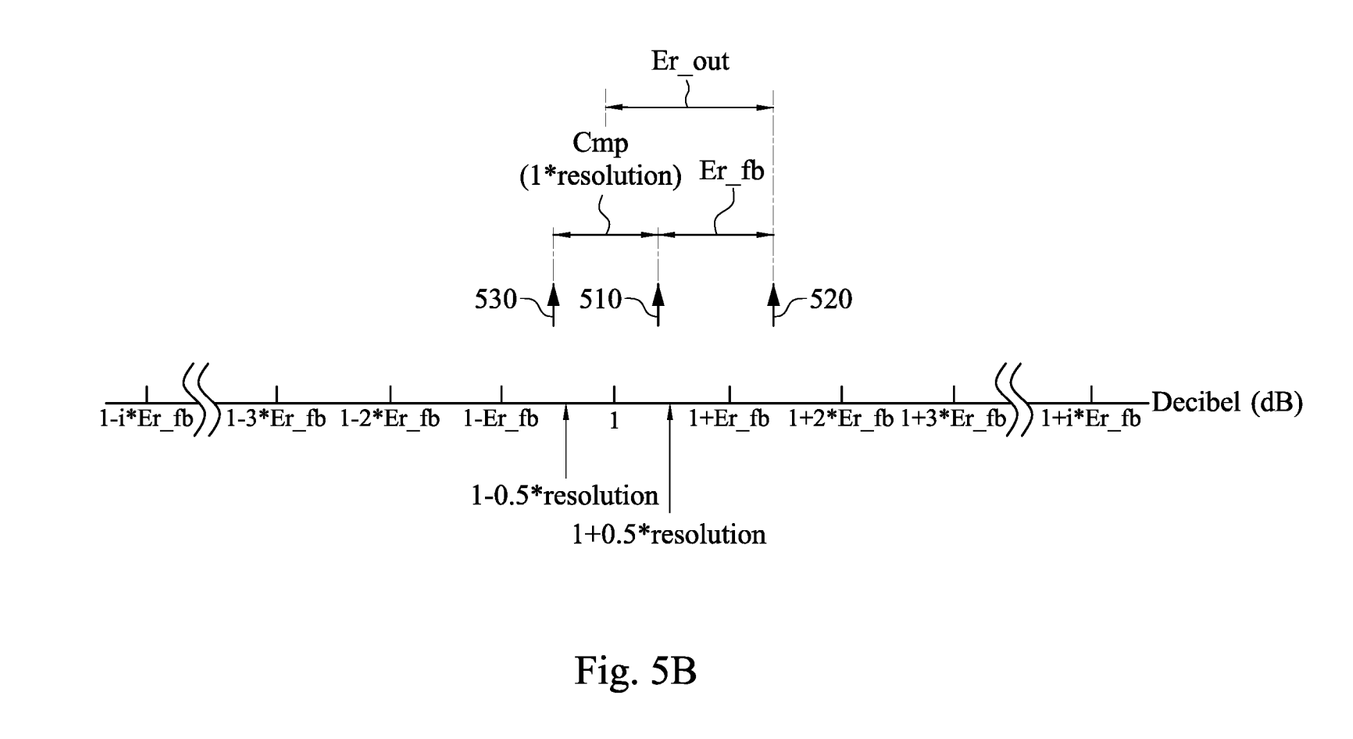
FIG. 5B is a schematic diagram of linearization process for output power of emission module, in accordance with another embodiment of the present disclosure.
Figure 5C:
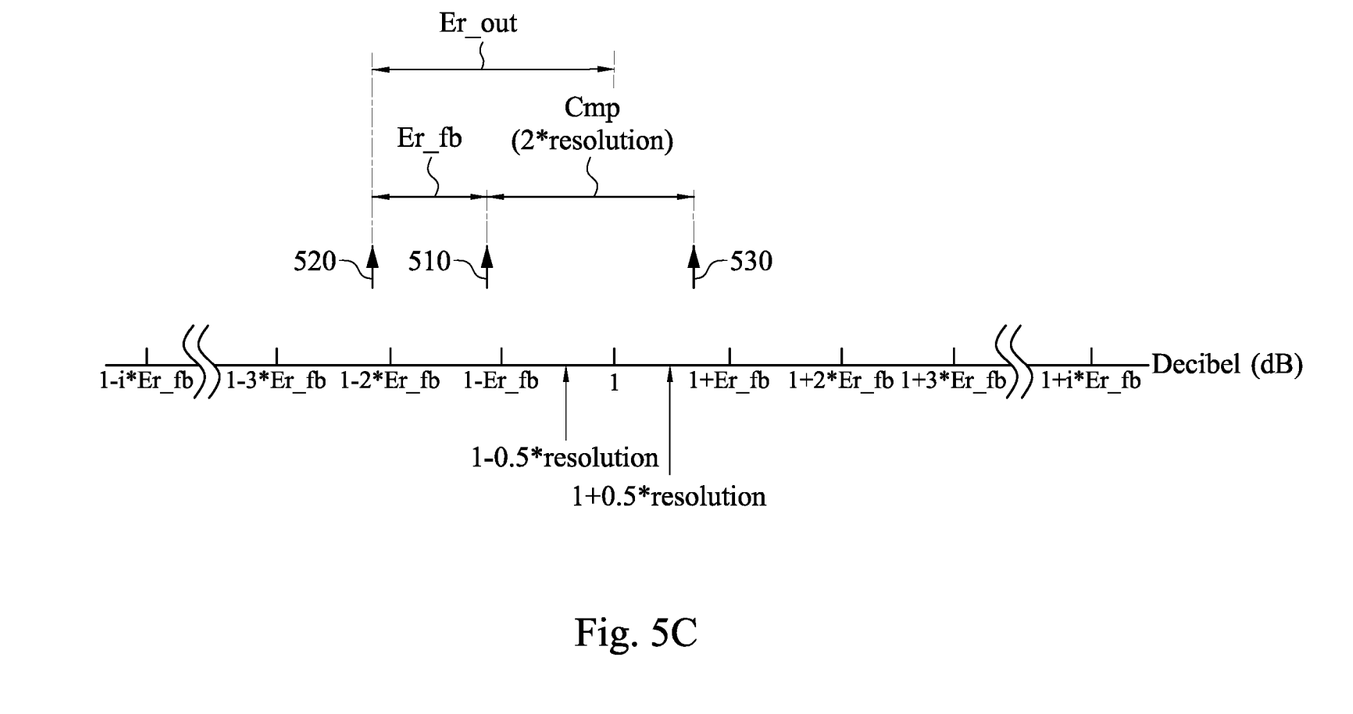
FIG. 5C is a schematic diagram of linearization process for output power of emission module, in accordance with yet another embodiment of the present disclosure.

FIGS. 4A-4C is a flowchart of an output power linearization method 400, in accordance with an embodiment of the present disclosure. FIGS. 5A-5C are schematic diagrams of linearization process for output power of the emission module 324, in accordance with some embodiments of the present disclosure. Reference is now made to FIG. 4A, in process S402, the baseband control circuit 322 provides the instruction signal Sd corresponding to a first input code and the baseband signal Sbs to the emission module 324, in which the first input code is configured to dictate one of the ideal output powers (hereinafter referred to as a "currently ideal output power") in the storage module 328. The emission module 324 modulates the baseband signal Sbs to the radio frequency signal Srf with a practical output power corresponding to the currently ideal output power according to the instruction signal Sd.

In this embodiment, the ideal output powers in the storage module 328 are substantially set to linearly increasing, and adjacent two of the ideal output powers have a preset decibel range in between. For instance, similar to the ideal output powers linearly increasing in FIG. 1. In other words, the preset decibel range aforementioned may be the output resolution of the power amplifier PA in FIG. 3.

In process S404, the feedback circuit 326 generates the feedback signal Fb according to the radio frequency signal Srf. The radio frequency system 320 performs a series of signal processing (e.g., analog to digital conversion and attenuation) on the feedback signal Fb to calculate the feedback output power represented by the feedback signal Fb, and writes the feedback output power into the storage module 328. Ideally, the feedback output power should be equal to the practical output power of the emission module 324. However, due to a transmission loss of the feedback circuit 326, there is a difference (hereinafter referred to as a "feedback error Er_fb") between the feedback output power and the practical output power.

In process S406, the baseband control circuit 322 reads the currently ideal output power and the feedback output power from the storage module 328, and calculates the output difference Er_out between the currently ideal output power and the feedback output power.

In process S408, the baseband control circuit 322 provides the output difference Er_out to the compensation value calculating circuit 310. The compensation value calculating circuit 310 determines whether the output difference Er_out is greater than 0 decibel. If yes, the calibration system 300 performs process S410. If no, the calibration system 300 performs process S412.

Reference is now made to FIG. 4B, in process S410, the compensation value calculating circuit 310 determines whether the feedback output power is greater than one or more threshold values greater than 0 decibel, in which the threshold values are configured to determine the gain compensation value Cmp. The thresholds may be pre-stored in a memory unit of the compensation value calculating circuit 310 itself, and the decibel range between any two adjacent threshold values is equal to the feedback error Er_fb. If so (i.e., the "Yes" prong of process S410), the calibration system 300 performs process S414 to reduce the gain (hereinafter referred to as a "present gain") of the emission module 324 corresponding to the currently instruction signal Sd. If not, the calibration system 300 does not adjust the present gain of the emission module 324, and performs process S420 mentioned below.

The process S410 will be further explained below in conjunction with FIG. 5A. The scale 1 in FIG. 5A represents the currently ideal output power of the emission module 324, and the remaining scales from (1+Er_fb) to (1+i*Er_fb), and from (1−Er_fb) to (1−i*Er_fb) represents multiple threshold values stored in the compensation value calculating circuit 310, in which i is a positive integer. Arrows 510, 520 and 530 represent the practical output power of the emission module 324, the feedback output power and the compensated practical output power, respectively.

As shown in FIG. 5A, since the practical output power (arrow 510) is equal to the currently ideal output power, the feedback output power (arrow 520) is equal to the currently ideal output power plus the feedback error Er_fb, and thus is located at the scale (1+Er_fb). In this situation, since the feedback output power (arrow 520) is not greater than any threshold value, the compensation value calculating circuit 310 determines that there is no need to adjust the present gain of the emission module 324, and sets the gain compensation value Cmp to 0. The calibration system 300 continues to perform process S420 mentioned below such that the compensated practical output power (arrow 530) is also equal to the currently ideal output power.

On the other hand, in process S414, the compensation value calculating circuit 310 sets the compensation value according to a multiple relationship between the output difference Er_out and the feedback error Er_fb. If a quotient is obtained by the output difference Er_out divided by the feedback error Er_fb, and M is obtained by unconditionally rounding off the said quotient after the decimal point, it means that the feedback output power is no less than M threshold values in the sections greater than 0 decibel. The compensation value calculating circuit 310 sets the gain compensation value Cmp to M times the resolution of the power amplifier PA, in which M is a positive integer. Then, the baseband control circuit 322 receives the gain compensation value Cmp from the compensation value calculating circuit 310, and subtracts the gain compensation value Cmp from the present gain of the power amplifier PA.

The process S414 will be further explained below in conjunction with FIG. 5B. In the situation of FIG. 5B, since M calculated by the compensation value calculating circuit 310 is equal to 1, the compensation value calculating circuit 310 sets the gain compensation value Cmp to 1 times the resolution of the power amplifier PA. Therefore, the compensated practical output power (arrow 530) is equal to the practical output power (arrow 510) minus 1 times the resolution of the power amplifier PA. Compare to the situation in FIG. 2, although the resolution of the power amplifier PA in the situation of FIG. 5B also approaches the feedback error Er_fb, the difference between the compensated practical output power (arrow 530) in FIG. 5B and the currently ideal output power is only about 0.5 times the resolution of the power amplifier PA, and unlike the situation in FIG. 2 that the difference is more than 2 times the resolution.

Reference is now made to FIG. 4C, in process S412, the compensation value calculating circuit 310 determines whether the feedback output power is smaller than one or more threshold values smaller than 0 decibel. If so, the calibration system 300 performs process S416 to increase the present gain of the emission module 324. If not, the calibration system 300 does not increase the present gain of the emission module 324, and performs process S420 mentioned below.

In process S416, the compensation value calculating circuit 310 sets the compensation value according to the multiple relationship between the output difference Er_out and the feedback error Er_fb. If a quotient is obtained by the output difference Er_out divided by the feedback error Er_fb, and M is obtained by unconditionally rounding off the said quotient after the decimal point, it means that the feedback output power is not greater than M threshold values in the sections smaller than 0 decibel. The compensation value calculating circuit 310 sets the gain compensation value Cmp to M times the resolution of the power amplifier PA, in which M is a positive integer. Then, the baseband control circuit 322 receives the gain compensation value Cmp from the compensation value calculating circuit 310, and adds the gain compensation value Cmp to the present gain of the power amplifier PA.

The process S416 will be further explained below in conjunction with FIG. 5C. In the situation of FIG. 5C, since M calculated by the compensation value calculating circuit 310 is equal to 2, the compensation value calculating circuit 310 sets the gain compensation value Cmp to 2 times the resolution of the power amplifier PA. Therefore, the compensated practical output power (arrow 530) is equal to the practical output power (arrow 510) adds 2 times the resolution of the power amplifier PA. As shown in FIG. 5C, in the situation that the resolution of the power amplifier PA approaches the feedback error Er_fb, even if the difference between the currently ideal output power and the feedback output power (arrow 520) is more than 2 times the resolution, the difference between the compensated practical output power (arrow 530) and the currently ideal output power still maintains around 0.5 times the resolution.

From process S408 to process S416, it can be understood that if an absolute value of the output difference Er_out is larger than an absolute value of the feedback error Er_fb, the baseband control circuit 322 adjusts the present gain of the emission module 324 so that the practical output power approaches the currently ideal output power.

As shown in FIGS. 4B-4C, the calibration system 300 performs process S418 after performing process S414 and process S418 in order to program a correspondence between the adjusted present gain, obtained in process S414 or process S416, and the first input code aforementioned into an output power control table 3281 in the storage module 328. Then, the calibration system 300 performs process S420 to determine whether a calibration times (i.e., numbers of times for performing output power linearization method 400) of the emission module 324 reaches a preset number of times. If so, the calibration system 300 terminates performing the output power linearization method 400. If not, the calibration system 300 performs process S402 again. The determination in process S420 may be performed by the baseband control circuit 322 or the compensation value calculating circuit 310.

In some embodiments, the preset number of times may be set to a number of levels of output power with different magnitudes that the emission module 324 can provide. For instance, if the emission module 324 may provide 10 levels of output power with different magnitudes, the preset number of times may be set to 10.

Furthermore, when the calibration system 300 performs process S402 again, the baseband control circuit 322 provides the instruction signal Sd corresponding to a second input code to the emission module 324. The second input code is different from the first input code aforementioned, and is configured to dictate another one of the ideal output powers in the storage module 328 as a new currently ideal output power. In other words, the calibration system 300 can automatically calibrate and linearize the output characteristics of the emission module 324.

Figure 6:
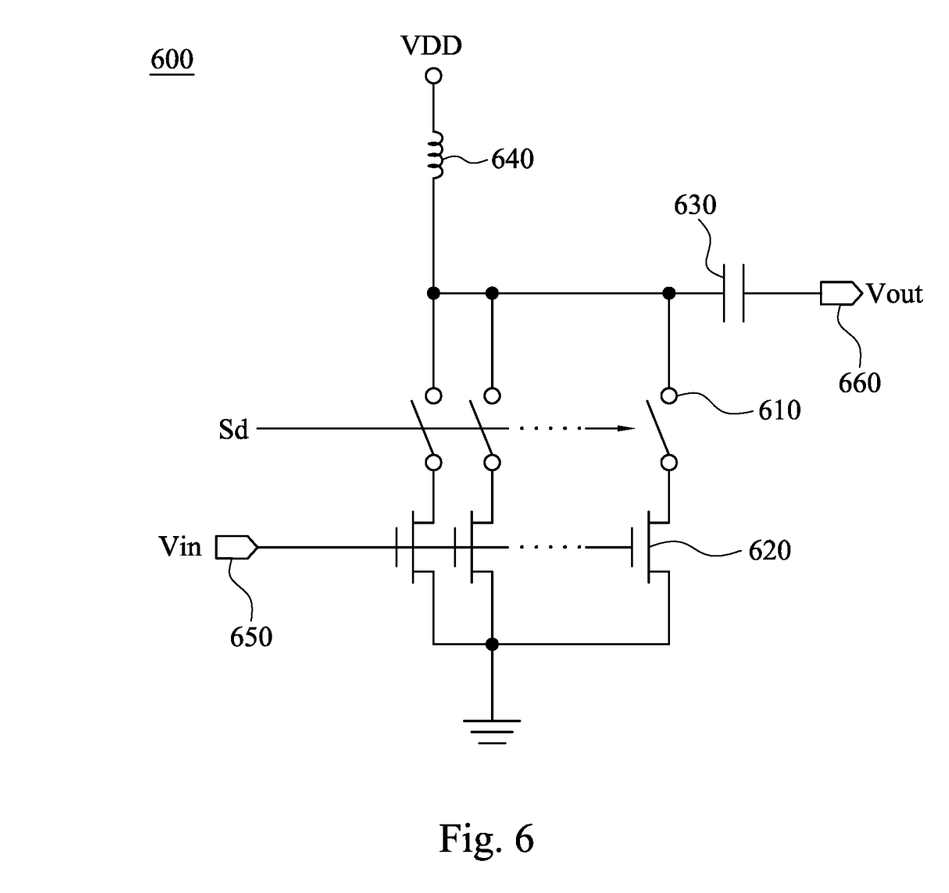
FIG. 6 is a simplified schematic diagram of an amplifier circuit, in accordance with an embodiment of the present disclosure.

The process S418 will be further explained below in conjunction with FIG. 6. FIG. 6 is a simplified schematic diagram of an amplifier circuit 600, in accordance with an embodiment of the present disclosure. The driver amplifier DA or the power amplifier PA in FIG. 3 may be implemented by the amplifier circuit 600, and the amplifier circuit 600 comprises a number of switches 610, a number of transistors 620, a DC blocking capacitor 630 and a radio frequency choke 640. A first terminal of the switches 610 are coupled to the DC blocking capacitor and the radio frequency choke 640, and a control terminal of the switches 610 are configured to receive the instruction signal Sd. A second terminal of each one of the switches 610 is coupled to a corresponding one of the transistors 620. A control terminal of the transistors 620 is coupled to an input terminal 650 of the amplifier circuit 600, and is configured to receive an input signal Vin, in which the input signal Vin may be the baseband signal Sbs or an AC signal generated by modulating the baseband signal Sbs. The DC blocking capacitor 630 is coupled between the switches 610 and an output terminal 660 of the amplifier circuit 600, and the output terminal 660 of the amplifier circuit 600 is configured to provide an output signal Vout. In some embodiments, the output signal Vout may be used as the radio frequency signal Srf in FIG. 3.

In practice, one or more resonant circuits may be coupled between the DC blocking capacitor 630 and the output terminal 660 in series or in parallel. For the sake of brevity, the resonant circuits are not shown in FIG. 6. Furthermore, implementations of the power amplifier PA in the present disclosure are not limited by the exemplary embodiment in FIG. 6.

The gain of the amplifier circuit 600 is determined by a number of transistors 620 that are conducted. Therefore, the baseband control circuit 322 may determine the number (e.g., N, N is a positive integer) of the transistors 620 that are conducted, and program a correspondence between the number of conducted transistors 620 and the first input code into the output power control table 3281.

In other words, the baseband control circuit 322 may program the adjusted present gain and/or the correspondence between the number of conducted transistors 620 and the first input code into the output power control table 3281.

Based on above, the calibration system 300 and the output power linearization method 400 thereof can not only improve the human resource efficiency by operating automatically but also not excessively compensate the output gain erroneously.

Certain terms used in the specification and the scope of the patent application are referred to specific elements. However, those skilled in the art should understand that the same element may be referred to different terms. The specification and the scope of the patent application should not use the difference in terms as a way of distinguishing elements, but the difference in function of elements. The terms "including", "comprising", "having", "containing" and the like, as used herein, are all open-ended terms, meaning "including but not limited to". In addition, the term "coupling" as used herein, includes any direct and indirect connection means. Therefore, if it is described in the text that the first element is coupled to the second element, it means that the first element may be directly connected to the second element through electrical connection, wireless transmission, optical transmission, or other signal connections, or may be electrically connected to the second element indirectly, through other elements or connection means.

The description "and/or" used herein includes any combination of one or more of the listed items. Furthermore, any term in the singular case also includes the meaning of the plural case, unless otherwise specified in the specification.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. An output power linearization method of a calibration system, wherein the output power linearization method comprising:
providing an instruction signal to an emission circuit of the calibration system, wherein the instruction signal corresponds to a currently ideal output power among a plurality of ideal output powers, and the emission circuit outputs a radio frequency signal with a practical output power according to the instruction signal;
obtaining a feedback signal, by a feedback circuit of the calibration system, from an output terminal of the emission circuit, and calculating a feedback output power from the feedback signal;
calculating an output difference between the currently ideal output power and the feedback output power; and
if an absolute value of the output difference is larger than an absolute value of a feedback error of the feedback circuit, adjusting a present gain of the emission circuit so that the practical output power approaches the currently ideal output power,
wherein the feedback error is a difference between the practical output power and the feedback output power caused by a transmission loss of the feedback circuit.

2. The output power linearization method of claim 1, wherein adjusting the present gain comprises:
if the output difference is greater than 0 decibel, and if the output difference is greater than the feedback error, reducing the present gain; and
if the output difference is smaller than 0 decibel, and if the output difference is smaller than the feedback error, increasing the present gain.

3. The output power linearization method of claim 2, wherein the ideal output powers are set to substantially linearly increased, and adjacent two of the ideal output powers have a preset decibel range in between.

4. The output power linearization method of claim 3, wherein reducing the present gain comprises subtracting M times the preset decibel range from the present gain, and increasing the present gain comprises adding M times the preset decibel range to the present gain.

5. The output power linearization method of claim 4, wherein M substantially equals to a quotient of the output difference divided by the feedback error.

6. The output power linearization method of claim 1, wherein the emission circuit comprises a power amplifier, the power amplifier comprises a plurality of switches coupled to each other in parallel, and when the emission circuit receives the instruction signal corresponding to the currently ideal output power, N of the switches are conducted, and N is a positive integer, wherein adjusting the present gain comprises:
determining a value of N according to the adjusted present gain.

7. The output power linearization method of claim 6, further comprising:
programing a correspondence between the determined value of N and the currently ideal output power into a look-up table in a storage module of the calibration system.

8. A calibration system comprising:
a baseband control circuit configured to provide an instruction signal, wherein the instruction signal corresponds to a currently ideal output power among a plurality of ideal output powers;
an emission circuit configured to output a radio frequency signal with a practical output power according to the instruction signal;
a feedback circuit configured to obtaining a feedback signal from an output terminal of the emission circuit, wherein the baseband control circuit is configured to calculate a feedback output power from the feedback signal, and is configured to calculate an output difference between the currently ideal output power and the feedback output power; and
a compensation value calculating circuit coupled to the baseband control circuit, wherein if the compensation value calculating circuit determines an absolute value of the output difference is larger than an absolute value of a feedback error of the feedback circuit, the baseband control circuit adjusts a present gain of the emission circuit so that the practical output power approaches the currently ideal output power, wherein the feedback error is a difference between the practical output power and the feedback output power caused by a transmission loss of the feedback circuit.

9. The calibration system of claim 8, wherein if the output difference is greater than 0 decibel and the output difference is greater than the feedback error, reduces the present gain, and if the output difference is smaller than 0 decibel and the output difference is smaller than the feedback error, increases the present gain.

10. The calibration system of claim 9, wherein the ideal output powers are set to substantially linearly increased, and adjacent two of the ideal output powers have a preset decibel range in between.

11. The calibration system of claim 10, wherein when the baseband control circuit reduces the present gain, the baseband control circuit subtracts M times the preset decibel range from the present gain, and when the baseband control circuit increases the present gain, the baseband control circuit adds M times the preset decibel range to the present gain, and M is a positive integer.

12. The calibration system of claim 11, wherein M substantially equals to a quotient of the output difference divided by the feedback error.

13. The calibration system of claim 8, wherein the emission circuit comprises a power amplifier, the power amplifier comprises a plurality of switches coupled to each other in parallel, and when the emission circuit receives the instruction signal corresponding to the currently ideal output power, N of the switches are conducted, and N is a positive integer, wherein
when the baseband control circuit adjusts the present gain, the baseband control circuit determines a value of N according to the adjusted present gain.

14. The calibration system of claim 8, further comprising a storage module, wherein the baseband control circuit is further configured to program a correspondence between the determined value of N and the currently ideal output power into a look-up table in the storage module.

15. A radio frequency system, comprising:
a baseband control circuit configured to provide an instruction signal, wherein the instruction signal corresponds to a currently ideal output power among a plurality of ideal output powers;
an emission circuit configured to output a radio frequency signal with a practical output power according to the instruction signal;
a feedback circuit configured to obtain a feedback signal from an output terminal of the emission circuit, wherein the baseband control circuit is configured to calculate a feedback output power from the feedback signal, and is configured to calculate an output difference between the currently ideal output power and the feedback output power; wherein
the baseband control circuit further configured to be coupled to a compensation value calculating circuit, and when the compensation value calculating circuit determines an absolute value of the output difference is larger than an absolute value of a feedback error of the feedback circuit, the baseband control circuit adjusts a present gain of the emission circuit so that the practical output power approaches the currently ideal output power, wherein the feedback error is a difference between the practical output power and the feedback output power caused by a transmission loss of the feedback circuit.

16. The radio frequency system of claim 15, wherein if the output difference is greater than 0 decibel and the output difference is greater than the feedback error, reduces the present gain, and if the output difference is smaller than 0 decibel and the output difference is smaller than the feedback error, increases the present gain.

17. The radio frequency system of claim 16, wherein the ideal output powers are set to substantially linearly increased, and adjacent two of the ideal output powers have a preset decibel range in between.

18. The radio frequency system of claim 17, wherein when the baseband control circuit reduces the present gain, the baseband control circuit subtracts M times the preset decibel range from the present gain, and when the baseband control circuit increases the present gain, the baseband control circuit adds M times the preset decibel range to the present gain.

\* \* \* \* \*